March 14, 1967 F. H. JONES 3,308,571
INSECT KILLING DEVICE
Filed June 10, 1965
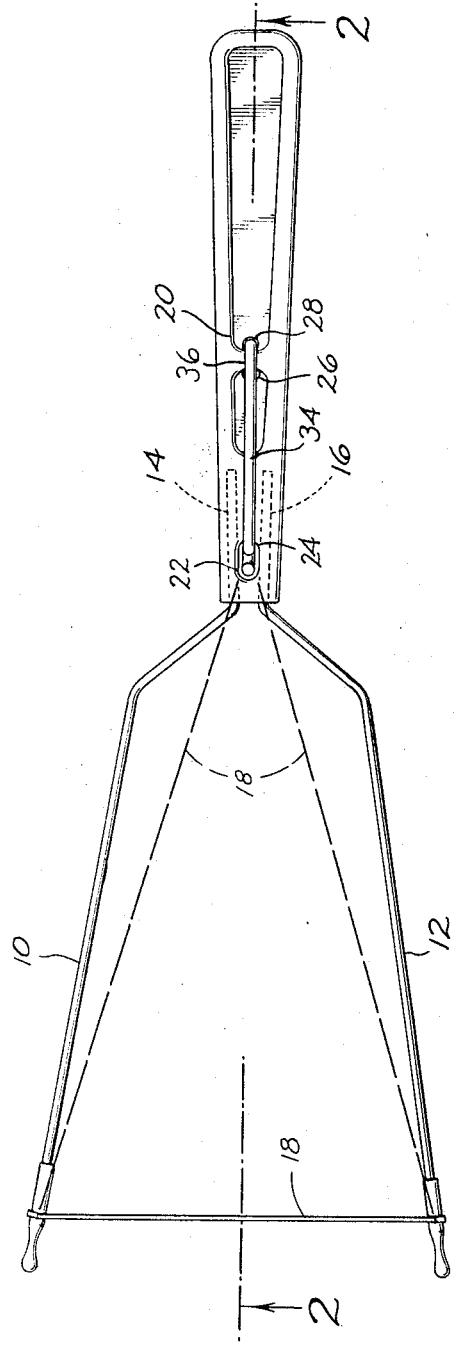
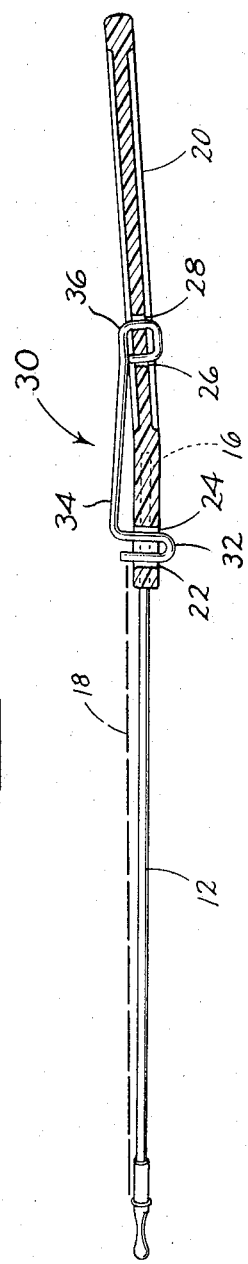
Forrest H. Jones
INVENTOR
BY *Eugene D. Forley*
Atty.

United States Patent Office 3,308,571
Patented Mar. 14, 1967

3,308,571
INSECT KILLING DEVICE
Forrest H. Jones, 1828 E. 15th,
The Dalles, Oreg. 97338
Filed June 10, 1965, Ser. No. 462,909
3 Claims. (Cl. 43—135)

This invention relates to a mechanical insect killing device of the class wherein the insect is killed by concussion.

It is the general purpose of the present invention to provide a device for killing insects, particularly the common house fly, efficiently and without the creation of unsightly stains.

It is a further purpose of the present invention to provide an insect killing device which converts an otherwise unpleasant chore to an occupation furnishing entertainment and sport.

In the drawings:

FIG. 1 is a plan view; and

FIG. 2 is a longitudinal sectional view of the insect killing device of my invention.

The presently described insect killing device takes advantage of the fact that the common house fly and other insects have limited eyesight, possessing only a cone of vision directed somewhat above the plane of the body of the insect. It accordingly becomes possible to approach the insect with a forked implement bearing a stretched, resilient band between its tines, the line of approach being coplanar with the insect's body, or parallel to the surface upon which the insect rests.

When the insect is located between the tines of the forked device, the band may be released. Thereupon it sweeps the area between the tines, unerringly killing the insect.

In the form of the invention illustrated in the drawings, the insect killing device of my invention comprises a forked support including a pair of tines 10, 12. These may be fabricated from stiff wire or other suitable material. Their outer ends are spread and apertured. Their inner ends are angled toward each other and provided with extensions 14, 16 respectively.

The ends of a resilient band 18, which may be a length of ordinary rubber band, are tied through the apertures in the ends of tines 10, 12. The band is stretchable from the relaxed, full line condition of the drawings to the stretched, dotted line position thereof. It will be observed that in the latter position it embraces substantially the entire area between the tines.

Tines 10, 12 are mounted on a handle 20 which may comprise a flat length of wood, plastic or metal suitably contoured to be held conveniently in the hand, and angled upwardly from the tines for convenience of operation. The mounting of the tines in the handle may be accomplished in any desired manner, for example, by pressing tine extensions 14, 16 into corresponding longitudinal, spaced openings in the end of the handle.

Trigger means are mounted on the handle, adapted releasably to engage the resilient band in its stretched condition. Various types of triggers may be employed for this purpose.

To accommodate the trigger illustrated in the drawings, handle 20 is provided with a first pair of longitudinally-aligned, closely-spaced, guide openings 22, 24, as well as with a pair of trigger anchor openings 26, 28. The latter openings are located centrally of the handle and are substantially aligned with guide openings 22, 24.

The trigger is indicated generally at 30. It comprises a length of resilient wire arranged longitudinally of the forward end of the handle. It includes a forward, reversely-bent, band-engaging section 32, a central spring section 34 and a rearward securing or anchoring section 36.

The forward, reversely-bent, band-engaging section 32 is dimensioned for slidable reception in guide openings 22, 24 of the handle. The free end of this section extends slightly above the plane of the handle so that it will engage the stretched rubber band, as shown particularly in FIG. 2.

The central spring section 30 of the trigger is dimensioned and contoured so that it is spaced slightly from the handle. It is dimensioned with respect to reversely bent, band-engaging section 32 in such a manner that when the spring section is depressed toward the handle by the thumb of the operator, the free end of the band-engaging section is depressed entirely below the plane of the handle.

Securing or anchoring section 36 of the trigger is received in anchor openings 26, 28, thereby securing the trigger to the handle.

The device thus described may be used to kill many species of insects, especially the common house fly, mosquito, bumble bee, hornet, wasp and ant. In its use the device first is cocked by stretching rubber band 18 to the dotted line position of the drawings and engaging it with the projecting end of reversely bent section 32 of trigger 30. Assuming that the insect to be killed is at rest on a table top or other flat, horizontal surface, the operator holds the device in his hand with his thumb resting lightly on spring section 34 of the trigger. He advances the device toward the fly, from behind, with the device held horizontally and substantially coplanar with the insect's body as well as parallel to the table top.

When the device is advanced in this manner, it is impossible for the insect to see the tines as they are extended beyond his body. The insect thus may be located in the between-tines area which is swept by the resilient band after it has been released.

At the proper moment, the operator depresses the trigger. Thereupon the projecting free end of reversely bent trigger section 32 is depressed below the plane of the upper surface of handle 20. This wipes the rubber band off the trigger projection, releasing it so that it snaps forwardly to its relaxed position. In so doing it kills the insect. This is done efficiently and without the production of unpleasant residues. Also, stalking the insect has its sportive aspects which lends an element of entertainment and competition to a task which otherwise is uninteresting and disagreeable.

It is to be understood that the form of my invention herein shown and described is to be taken as a preferred example of the same and that various changes in the shape, size and arrangement of parts may be resorted to without departing from the spirit of my invention or the scope of the subjoined claims.

Having thus described my invention, I claim:

1. An insect killing device comprising
   (a) a forked support including two tines having spaced outer ends,
   (b) a handle fastened to the inner ends of the tines and projecting inwardly above the plane of the tines,
   (c) a resilient band mounted across the outer ends of the tines and stretchable between a relaxed condition, wherein it spans the space between the outer ends of the tines, and a stretched condition wherein it extends to the handle in substantially the same plane as the tines, and
   (d) trigger means mounted on the handle and having a band-retaining segment normally projecting above the handle and releasably engaging the resilient band in its stretched condition and an actuating segment normally spaced above the handle and movable toward the handle to retract the band-retaining segment,
(e) the device being dimensioned to locate an insect between the tines when the band is in its stretched condition, in the area traversed by the band as it snaps from its stretched condition to its relaxed condition upon its release by the trigger means.

2. An insect killing device comprising
(a) a forked support including two tines having spaced outer ends,
(b) a handle fastened to the inner ends of the tines and provided with a pair of longitudinally spaced guide openings,
(c) a resilient band mounted across the outer ends of the tines and stretchable between a relaxed condition, wherein its bands are spaced between the outer ends of the tines, and a stretched condition wherein it extends to the handle in substantially the same plane as the tines, and
(d) trigger means mounted on the handle and adapted releasably to engage the resilient band in its stretched condition, the trigger means comprising a resilient wire arranged longitudinally of and on top of the handle and formed in a forward, reversely-bent, band-retaining segment dimensioned for slidable reception in the guide openings, with the free end of the segment extending outwardly beyond the plane of the handle for engaging the band in stretched condition, and a central spring segment spaced above the handle and having securing means extending through the handle for fixing the spring segment to the handle,
(e) the device being dimensioned to locate an insect between the tines when the band is in its stretched condition, in the area traversed by the band as it snaps from its stretched condition to its relaxed condition upon its release by the trigger means.

3. An insect killing device comprising:
(a) a forked support including two tines having spaced outer ends,
(b) a handle fastened to the inner ends of the tines and provided with a pair of longitudinally spaced guide openings,
(c) a resilient band mounted across the outer ends of the tines and stretchable between a relaxed condition, wherein it spans the space between the outer ends of the tines, and a stretched condition wherein it extends to the handle in substantially the same plane as the tines, and
(d) trigger means mounted on the handle and adapted releasably to engage the resilient band in its stretched condition, the trigger means comprising a resilient wire arranged longitudinally of the handle and formed in a forward, reversely-bent, band-retaining segment dimensioned for slidable reception in the guide openings, with the free end of the segment extending outwardly beyond the plane of the handle for engaging the band in its stretched condition, a central spring segment spaced from the handle, and securing means for fixing the spring segment to the handle, the securing means comprising a bent portion of the spring segment penetrating and gripping the handle,
(e) the device being dimensioned to locate an insect between the tines when the band is in its stretched condition, in the area traversed by the band as it snaps from its stretched condition to its relaxed condition upon its release by the trigger means.

References Cited by the Examiner
UNITED STATES PATENTS

| 1,009,531 | 11/1911 | Kopp | 43—135 X |
| 1,084,008 | 1/1914 | Hamaker | 124—14 |
| 1,452,902 | 4/1923 | Williamson | 124—35 |
| 2,496,217 | 1/1950 | Keary | 124—22 |

FOREIGN PATENTS 293,731   8/1916   Germany.

SAMUEL KOREN, Primary Examiner.
ALDRICH F. MEDBERY, Examiner.